UNITED STATES PATENT OFFICE.

WILLIAM BEACH PRATT, OF WELLESLEY, MASSACHUSETTS.

GUM AND PROCESS OF MAKING THE SAME.

1,240,875. Specification of Letters Patent. Patented Sept. 25, 1917.

No Drawing. Application filed November 1, 1913, Serial No. 798,701. Renewed February 28, 1917. Serial No. 151,556.

*To all whom it may concern:*

Be it known that I, WILLIAM BEACH PRATT, a citizen of the United States, and a resident of Wellesley, in the county of Norfolk and State of Massachusetts, have invented certain new and useful Improvements in Gum and the Processes of Making the Same, of which the following is a specification.

There are certain plants which have a latex or milky juice containing a convertible starch, among which are the cow tree (locally called the milk tree) and the bread-fruit tree. I have discovered a method of treating this latex to produce a new substance. For example, by my process, I am able to produce a gummy solid compound which forms what may be termed a natural chewing gum and which may be used in place of chicle to supply the enormous demand which now exists in the trade.

This latex contains, as I have stated, a starch which is convertible to sugar by fermentation, some or all of which is removable by subsequent treatment.

I will explain a process of treating the latex of the cow tree, for example, to produce a new compound which may be used as a chewing gum.

A quantity of the latex drawn from the cow tree (*i. e. Brosimum galactodendron*) is fermented in any suitable way. The resulting fluid is then boiled or otherwise treated to remove the water, there resulting from this treatment a dark-yellowish sticky mass containing a syrupy sugar. This mass is washed in cold water to remove foreign matter, the free starch (if any remain) and the more soluble sugar,—a certain proportion of the sugar, if desired, remaining in the residuum.

The resultant compound is an amorphous waxy solid, yellowish in color, but changing to pure white when pulled, plastic and non-adhesive in the presence of water at a temperature of 98° F., brittle and breaking with a clean fracture when at a temperature of approximately 50° F., combustible, and neutral in taste. It has a globular characteristic somewhat similar to rubber.

For use as a chewing gum, care should be taken to prevent the fermented mass from boiling long enough to crystallize the sugar or change it to caramel, if it is desirable that the residuum should contain most of the sugar. The sugar may be entirely removed, however, in the event that it be desirable that the product contain none.

The residuum may without further treatment be pulled and worked into mass and marketed and used for masticating purposes, or there may be mixed and worked into it such flavoring matter, syrups, sugar or other compounds as may be desired. The product or residuum is superior to chicle as the base for chewing gum, in that it is whiter, will retain flavoring materials for a greater length of time, and will take up more compound without becoming too brittle for use.

I have not attempted to name all the species of trees or plants from which can be obtained a latex containing the starch which is convertible by fermentation to sugar, as there are many others having a latex which may be subjected to the treatment I have herein described to secure the herein-described product. Hence, in referring to the latex of the cow tree, I wish to be understood as including all those which contain a convertible starch, and which, when subjected to the herein described process, produce a substance having substantially the characteristics herein set forth. I have found the fermentation (or conversion of starch to sugar) to be an essential step, since otherwise a mass coagulation having the desired physical characteristics cannot be secured.

Roughly speaking, the latex of *Brosimum galactodendron* when first tapped contains the following constituents in substantially the proportions given, to wit, water 40%, cellular or globular content 30%, and convertible starch 30%. After the latex has been fermented and boiled to remove the water, and the residuum is washed and cleaned, it consists of approximately 75% globular or cellular content and 25% sugar. I have found that fifty pounds of latex produces approximately twelve pounds of the sugar-containing residuum, when subjected to the treatment described.

To further identify the substance produced by my method of treating the latex, I may state that by further boiling the residuum, and changing the sugar to caramel in which condition it is soluble in water, there is produced a yellowish mass which is substantially sugar-free and which apparently consists substantially of globular or cellular matter. If the boiling is continued too long, the globular structure is destroyed, leaving a complex resinous product or mass.

I claim:—

1. As a new article of manufacture, the solid residuum of a latex, having a globular characteristic, plastic and non-adhesive in the presence of water at a temperature of 98° F., brittle and breaking with a clean fracture when at a temperature of approximately 50° F., combustible, and neutral in taste.

2. As a new article of manufacture, the gummy solid residuum of a latex, said residuum containing a converted starch.

3. A new product consisting of a coagulated organic gummy mass, having a globular characteristic like rubber but with a sugar content, said mass being plastic and non-adhesive in the presence of water at a temperature of 98° F.

4. As a new article of manufacture, a product consisting of the coagulated residuum of the latex of the cow tree.

5. A chewing gum comprising a coagulated gummy residuum of a latex containing its original starch in the form of sugar.

6. A chewing gum comprising the gummy coagulated sugar-containing residuum of the cow-tree latex.

7. The herein described process, which consists in fermenting a latex containing a convertible starch, and removing the water of the resultant fluid, thereby leaving a sugar-containing residuum.

8. The herein described process which consists in fermenting a latex containing a convertible starch, removing the water of the fermented liquid, and washing the residuum.

9. The herein described process of treating a latex containing a convertible starch, which consists in converting the starch to sugar, removing the water, and then abstracting more or less of the sugar.

10. The herein described process of treating a latex containing a convertible starch, which consists in fermenting the latex to convert the starch to sugar, then boiling it for the removal of the water, then washing the residuum, and then working the residuum into mass.

11. The herein described process of treating the latex of the cow tree which consists in converting the starch thereof to sugar, then boiling the latex for the removal of water, then washing the residuum to remove as much sugar as may be desired, and then working the residuum into the mass.

In testimony whereof I have affixed my signature, in presence of two witnesses.

WILLIAM BEACH PRATT.

Witnesses:
MARCUS B. MAY,
P. W. PEZZETTI.